United States Patent
Dehmann et al.

(10) Patent No.: US 9,499,052 B2
(45) Date of Patent: Nov. 22, 2016

(54) METHOD FOR PROVIDING AN OPERATING DEVICE IN A VEHICLE AND OPERATING DEVICE

(71) Applicant: VOLKSWAGEN AG, Wolfsburg (DE)

(72) Inventors: Rainer Dehmann, Berlin (DE); Frank Hauschild, Berlin (DE); Sönke Petersen, Berlin (DE); Mathias Kuhn, Berlin (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/351,909

(22) PCT Filed: Oct. 9, 2012

(86) PCT No.: PCT/EP2012/004231
§ 371 (c)(1),
(2) Date: Apr. 15, 2014

(87) PCT Pub. No.: WO2013/053465
PCT Pub. Date: Apr. 18, 2013

(65) Prior Publication Data
US 2014/0303843 A1    Oct. 9, 2014

(30) Foreign Application Priority Data

Oct. 15, 2011 (DE) .................. 10 2011 116 122

(51) Int. Cl.
*G06F 3/01* (2006.01)
*B60W 10/00* (2006.01)
*B60K 37/06* (2006.01)

(52) U.S. Cl.
CPC ............ *B60K 37/06* (2013.01); *G06F 3/017* (2013.01); *B60K 2350/1052* (2013.01)

(58) Field of Classification Search
CPC ........... G06F 3/017; G06F 2203/0381; B60K 37/06; B60K 2350/1028; B60K 2350/1052

USPC .................. 701/36–37; 348/222.1
See application file for complete search history.

(56) References Cited

U.S. PATENT DOCUMENTS

| 2004/0068409 | A1 | 4/2004 | Tanaka et al. |
| 2009/0278915 | A1* | 11/2009 | Kramer et al. ............... 348/48 |
| 2009/0327977 | A1 | 12/2009 | Bachfischer et al. |
| 2011/0080490 | A1* | 4/2011 | Clarkson et al. ......... 348/222.1 |

FOREIGN PATENT DOCUMENTS

| CN | 101667061 A | 3/2010 |
| DE | 102006037156 A1 | 9/2007 |

(Continued)

OTHER PUBLICATIONS

Search Report for International Patent Application No. PCT/EP2012/004231; Mar. 18, 2013.

*Primary Examiner* — Nga X Nguyen
(74) *Attorney, Agent, or Firm* — Barnes & Thornburg LLP

(57) ABSTRACT

A method for providing an operating device in a vehicle, wherein a control device generates graphics data which control a display surface so that a graphics object relating to an executed application is displayed, and the geometric structure of an actuating object is detected in a detection space in front of the display surface and, depending upon the detected structure, a control signal for controlling the executed application is generated. A control signal for stopping the executed application is generated by the control system if a geometric structure of the actuating object has been detected in the detection space, wherein a substantially planar surface of the actuating object which is oriented substantially parallel to the display surface is spaced apart from the display surface. Also disclosed is a corresponding operating device for carrying out the method and a vehicle having such an operating device.

5 Claims, 3 Drawing Sheets

(56) References Cited

FOREIGN PATENT DOCUMENTS

| EP | 1408443 | A1 | 4/2004 |
| JP | 2006323492 | A | 11/2006 |
| WO | 2011003947 | A1 | 1/2011 |
| WO | 2011051361 | A1 | 5/2011 |

* cited by examiner

METHOD FOR PROVIDING AN OPERATING DEVICE IN A VEHICLE AND OPERATING DEVICE

PRIORITY CLAIM

This patent application is a U.S. National Phase of International Patent Application No. PCT/EP2012/004231, filed 9 Oct. 2012, which claims priority to German Patent Application No. 10 2011 116 122.1, filed 15 Oct. 2011, the disclosures of which are incorporated herein by reference in their entirety.

SUMMARY

Illustrative embodiments relate to a method for providing an operator control apparatus in a vehicle. The method involves a control apparatus producing graphics data that actuate a display panel such that a graphical object is displayed for an executed application. In addition, the geometric structure of an operating object is sensed in a detection space in front of the display panel, and the sensed structure is taken as a basis for producing a control signal for controlling the executed application. Illustrative embodiments also relate to an operator control apparatus for a vehicle. The operator control apparatus comprises a display apparatus having a display panel and comprises a control apparatus that is coupled to the display apparatus and by means of which it is possible to produce graphics data for displaying a graphical object for an executed application. In addition, the operator control apparatus comprises a gesture sensing device for sensing the geometric structure of an operating object in a detection space in front of the display panel.

BRIEF DESCRIPTION OF THE DRAWINGS

Disclosed embodiments are now explained with reference to the drawings.

DETAILED DESCRIPTION OF THE DISCLOSED EMBODIMENTS

Figure 1:
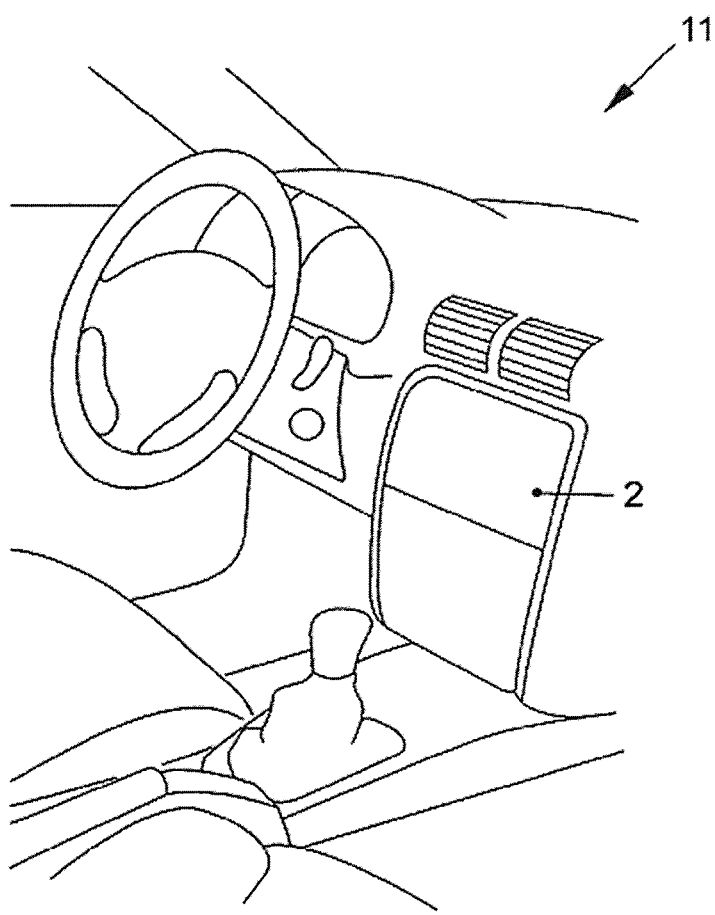
FIG. 1 shows a vehicle with the disclosed embodiment of the operator control apparatus.

Disclosed embodiments provide a method and an operator control apparatus that allow the executed application to be controlled quickly and intuitively.

In the method, the control apparatus is used to produce a control signal for stopping the executed application when a geometric structure that has been sensed for the operating object in the detection space involves an essentially planar face of the operating object, which face is oriented essentially parallel to the display panel, being arranged at a distance from the display panel.

The operating object that is used for the method may be the hand of a user, particularly the hand of the driver of the vehicle. The method, therefore, involves the control apparatus being used to stop the executed application particularly when it has been sensed that the palm of the hand points essentially parallel to the display panel. The method allows the user, i.e., particularly the driver of the vehicle, to stop a currently executed application intuitively and quickly by moving his hand into the detection space and orienting his palm parallel to the display panel. In this way, the driver can execute what is known as a stop gesture. This advantageously does not require the driver to turn his eyes away from the driving. In this way, the method contributes to safe driving of the vehicle.

Within the context of the disclosed embodiments, an essentially parallel orientation with respect to the display panel is understood to mean that a certain tolerance range for the orientation of the face is included. Particularly when the operating object is the hand of a user, the palm of the opened hand is considered to be a planar face, since the opened hand forms an essentially planar face on the inside of the hand in comparison with the geometric structure of a fist, for example. This planar face of the opened palm is particularly essentially parallel to the display panel when the deviation from the exactly parallel orientation with respect to the display panel is less than +/−20°, particularly less than +/−10°. In this case, in particular, a distinction from an opened hand that is oriented essentially at right angles to the display panel is sensed.

According to at least one disclosed embodiment of the method, the application relates to the reproduction of voice and/or music files, which involves the production of an audible output via a loudspeaker and/or headphones. When, in this case, a geometric structure that has been sensed for the operating object in the detection space involves an essentially planar face of the operating object, which face is oriented essentially parallel to the display panel, being arranged at a distance from the display panel, one refinement involves a control signal for stopping the reproduction of the voice and/or music files being produced. Another disclosed embodiment involves a control signal for muting the audible output via the loudspeaker and/or the headphones being produced. In the last case, the reproduction continues but there is no audible output.

In particular driving situations, it is important for the driver of the vehicle to stop the reproduction or the audible output of a music or voice file very quickly. The method according to the invention allows the driver to quickly stop the reproduction or the audible output very intuitively by means of the fast stop gesture described above.

According to at least one disclosed embodiment of the method, the control signal for stopping the executed application is produced when a geometric structure that involves an essentially planar face of the operating object, which face is oriented essentially parallel to the display panel, being arranged at a distance from the display panel has been sensed for the operating object in the detection space for a previously defined interval of time. This refinement prevents just a short, random arrangement of the opened hand oriented parallel to the display panel from being sufficient to stop the application. By way of example, the user needs to hold his opened hand in front of the display panel for a certain interval of time, e.g. at least 1 s or at least 3 s, to stop the application. This increases the certainty of operator control and avoids operator control errors.

The operator control apparatus can be used to produce a control signal for stopping the executed application when a geometric structure that the gesture sensing device has sensed for the operating object in the detection space involves an essentially planar face of the operating object, which face is oriented essentially parallel to the display panel, being arranged at a distance from the display panel.

In particular, the operator control apparatus can execute the method steps cited above in part or completely. The operator control apparatus can be used for the operator control of various devices in the vehicle. The operator control apparatus has the same advantages cited above as the method disclosed.

Furthermore, disclosed embodiments relate to a vehicle having the operator control apparatus. In this case, the detection space is arranged such that it can easily be reached by the driver and/or the front seat passenger.

Figure 2:
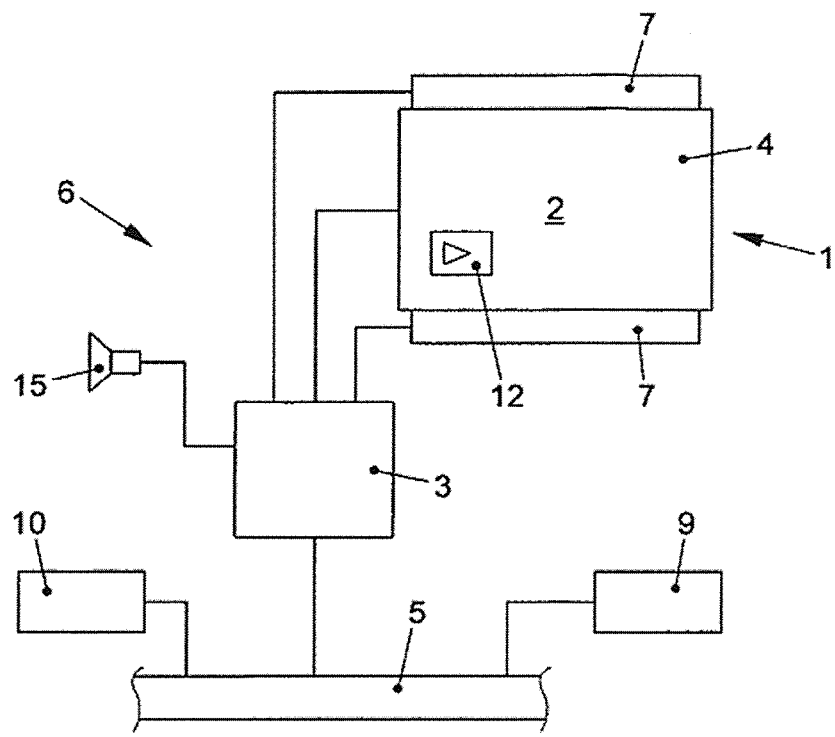
FIG. 2 schematically shows a disclosed embodiment of the operator control apparatus and the connection of this operator control apparatus to other devices in the vehicle.
Figure 3:
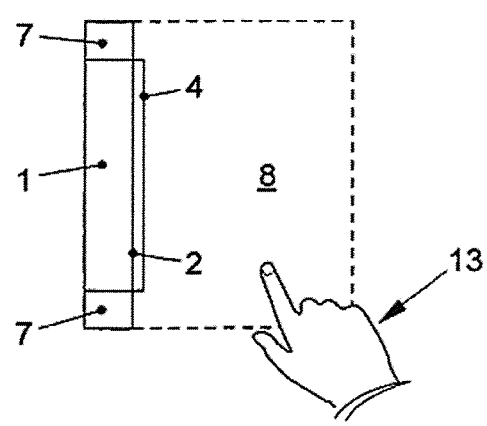
FIG. 3 shows a sectional view of the display apparatus of the disclosed embodiment of the operator control apparatus.

With reference to FIGS. 1 to 3, an exemplary embodiment of the operator control apparatus 6 and the arrangement thereof in a vehicle 11 is explained.

The operator control apparatus 6 comprises a display apparatus 1 having a display panel 2 that is arranged in the interior of the vehicle 11 such that it is easily visible to at least one vehicle occupant, particularly the driver. The display panel 2 can be provided by a display, particularly a liquid crystal display, of any design.

The operator control apparatus 6 also comprises a control apparatus 3 and an input apparatus. The control apparatus 3 is connected to the display apparatus 1, which can be used to produce graphics data for the presentation of information on the display panel 2. The input apparatus comprises a touch-sensitive surface 4 that is produced on the display panel 2. Hence, what is known as a touch screen is provided.

Furthermore, the input apparatus comprises a gesture sensing device 7. The gesture sensing device 7 can be used to sense gestures from a user in a detection space 8. The detection space 8 is produced in front of the display panel 2, as shown in detail in FIG. 3. The user can execute gestures in the detection space 8 with an operating object, in the present case with his hand 13. The gestures are sensed by the gesture sensing device 7, and analysis of the gestures is followed by control signals being transmitted from the gesture sensing device 7 to the control apparatus 3.

Within the meaning of the present disclosure, a gesture is understood to mean a particular position or posture of the hand of a user or a particular movement that is executed with the hand of the user. In this case, the geometric structure of the hand is sensed in the detection space. The gestures are executed in the detection space 8 in front of the display panel 2 without the need for the display panel to be touched.

By way of example, the gesture sensing device 7 may comprise infrared light sources and infrared light detectors. Alternatively, it may comprise an optical system with a camera that records the gesture executed in the detection space 8. Such a gesture sensing device 7 is known per se. An example of such a gesture sensing device, as may be used in the case of the present disclosed embodiment, is described in WO 2011/003947 A1.

In addition, the control apparatus 3 is coupled to a data bus 5. This data bus 5 connects the control apparatus 3 to further devices 9, 10 in the vehicle 11, for which further devices it is necessary to display information on the display panel 2 and which further devices are intended to be operated by means of the operator control apparatus 6. The operator control apparatus 6 and the method can be used to display information to the vehicle occupants. In addition, the vehicle occupants can use the operator control apparatus 6 to operate devices 9, 10 in the vehicle 11 and to control the display.

Finally, the control apparatus 3 is coupled to a loudspeaker 15 that can be used to produce an audible output.

Figure 4:
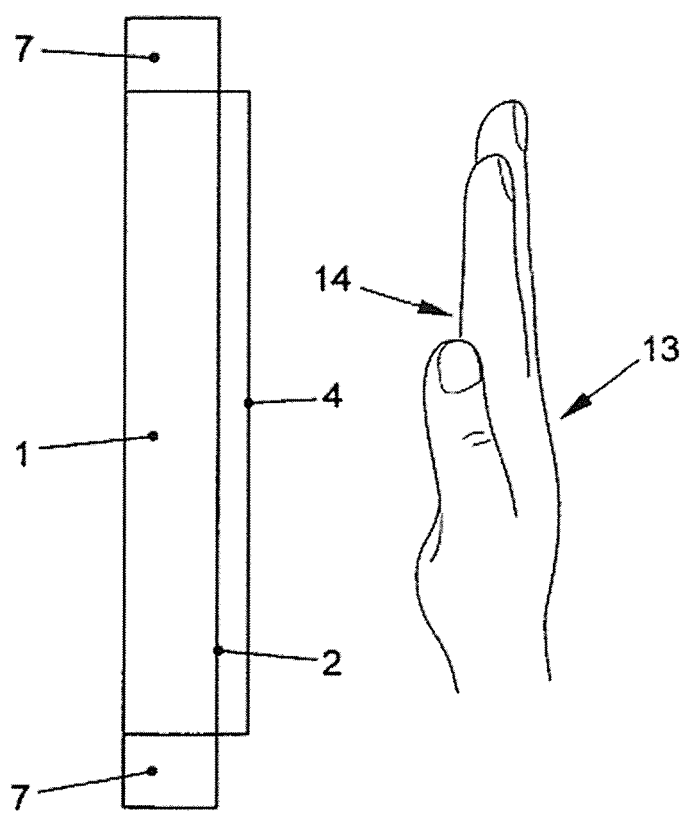
FIG. 4 shows a stop gesture executed by a user in front of the display panel.

The following text provides the detailed explanation of an exemplary embodiment of the method that can be carried out by the operator control apparatus 6 described hereinabove, with reference to FIG. 4.

It is subsequently assumed that the device 9 is a reproduction appliance for music and/or voice files. By way of example, the device 9 is what is known as an MP3 player. A particular music file is currently being reproduced. The control apparatus 3 produces an associated audible output via a loudspeaker 15. Furthermore, the control apparatus 3 is used to display on the display panel 2 a graphical object 12 that is associated with the piece of music currently being played back. This graphical object 12 is shown only schematically in FIG. 2. By way of example, it is possible to show extensive buttons for controlling the reproduction of the piece of music and information pertaining to the piece of music, such as a CD cover.

To stop the reproduction of the piece of music, or alternatively to mute the loudspeaker 15 by means of the control apparatus 3, the driver of the vehicle 11 moves his hand 13 into the detection space 8, for example. The mere entry of the hand 13 into the detection space 8 can be sensed by the gesture sensing device 11, whereupon the display on the display panel 2 changes from a display state to what is known as an operator control state, in which operable buttons are displayed in a different manner than in the display state.

The user then opens his hand 13, so that a palm 14 is produced that is essentially planar. The user orients this palm 14 such that it is essentially parallel to the display panel 2. If this geometric structure of the hand 13 of the user is sensed by the gesture sensing device 7 for an interval of time of 1 s, for example, that is stored in the control apparatus 3, the control apparatus 3 interprets the sensed gesture as what is known as a stop gesture. The control apparatus 3 then stops the reproduction of the music file via the device 9 or alternatively mutes the audible output via the loudspeaker 15.

The user then moves his hand 13 out of the detection space 8 again. The display on the display panel 2 then changes back from the operator control state to the display state. When the user wishes to restart reproduction of the music file, or to cancel muting of the loudspeaker 15, he can move his hand 13 back into the detection space 8. The display on the display panel 2 then changes back from the display state to the operator control state. The user can then operate the touch-sensitive surface 4, for example, at a position at which the display panel 2 displays an appropriate button that is associated with a control command for beginning reproduction of the piece of music or for canceling the muting of the loudspeaker 15.

With the increase in electronic devices in the vehicle, it has become necessary to present a relatively large volume of information in the vehicle. By way of example, modern vehicles comprise not only a multifunction display but also a multiplicity of driver assistance systems, the information from which needs to be displayed in the vehicle. Furthermore, vehicles frequently comprise a navigation system. Such a navigation system can be used to display digital geographical road maps with a route and, if need be, a wide variety of supplementary information. Finally, modern vehicles frequently comprise communication and multimedia applications, including a mobile telephone interface and devices for reproducing music and voice. For these applications too, the vehicle needs to have the option of displaying information.

The display of information in a vehicle gives rise to very specific requirements. The information is taken up in the vehicle by the driver, inter alia. Therefore, the information should be presented in the vehicle such that the uptake of information by the driver does not result in a distraction during the journey. The presented information should therefore be able to be grasped by the driver intuitively and quickly, so that he need turn his eyes away from the driving only very briefly to take up the information. If operator control of the vehicle devices is supported or conducted by a display, the display should be provided such that the driver need look at the display only very briefly or not at all for operator control to perform operator control.

WO 2011/003947 A1 discloses a method and an apparatus for providing a user interface in a vehicle. The apparatus comprises a gesture sensing device for sensing gestures in a sensing space that is arranged in front of a display panel. In addition, the apparatus comprises an analysis device that can be used to associate the sensed gestures with operator control objects or display objects and with a control command. A control apparatus can then be used to execute the control command.

LIST OF REFERENCE SYMBOLS

1 Display apparatus
2 Display panel
3 Control apparatus
4 Touch-sensitive surface
5 Data bus
6 Operator control apparatus
7 Gesture sensing device
8 Detection space
9 Device in the vehicle
10 Device in the vehicle
11 Vehicle
12 Graphical object
13 Operating object, hand of a user
14 Palm
15 Loudspeaker

The invention claimed is:

1. A method for controlling an apparatus in a vehicle, the method comprising:
    producing, through a control apparatus, graphics data that actuate a display panel such that a graphical object associated with an executed application is displayed on the display panel; and
    sensing a geometric structure of an operating object positioned in a detection space located in front of the display panel, wherein sensing of the geometric structure is a basis for producing a control signal for controlling the executed application;
    wherein the control apparatus produces a control signal for stopping the executed application when sensed geometric structure includes a planar face of the operating object in the detection space located in front of the display panel, the planar face being oriented parallel to the display panel and arranged at a distance from the display panel;
    Wherein the application relates to the reproduction of voice and/or music files, which involves the production of an audible output via a loudspeaker and/or headphones, and a control signal is produced for (1) stopping the reproduction of the voice and/or music file, or (2) muting the audible output via the loudspeaker and/or the headphones when a geometric structure that has been sensed for the operating object in the detection space involves the planar face of the operating object, which face is oriented parallel to the display panel and is positioned at a distance from the display panel.

2. The method of claim 1, wherein the operating object is the hand of a user, and the control apparatus stops the executed application in response to sensing that the palm of the hand is parallel to the display panel.

3. The method of claim 1, wherein the control signal for stopping the executed application is produced when the geometric structure that involves the planar face of the operating object, which face is oriented parallel to the display panel, and positioned at a distance from the display panel has been sensed for the operating object in the detection space for a previously defined interval of time.

4. An operator control apparatus for a vehicle, the operator control apparatus comprising:
    a display apparatus having a display panel;
    a control apparatus that is coupled to the display apparatus and which produces graphics data for displaying a graphical object for an executed application on the display panel; and
    a gesture sensing device for sensing the geometric structure of an operating object in a detection space in front of the display panel,
    wherein the control apparatus produces a control signal for stopping the executed application when the geometric structure that the gesture sensing device has sensed a planar face of the operating object in the detection space located in front of the display panel, the face being oriented parallel to the display panel and being positioned at a distance from the display panel;
    Wherein the application relates to the reproduction of voice and/or music files, which involves the production of an audible output via a loudspeaker and/or headphones, and a control signal is produced for (1) stopping the reproduction of the voice and/or music file, or (2) muting the audible output via the loudspeaker and/or the headphones when a geometric structure that has been sensed for the operating object in the detection space involves the planar face of the operating object, which face is oriented parallel to the display panel and is positioned at a distance from the display panel.

5. A vehicle having an operator control apparatus as claimed in claim 4.

* * * * *